US012369525B2

(12) United States Patent
Christiansen et al.

(10) Patent No.: US 12,369,525 B2
(45) Date of Patent: Jul. 29, 2025

(54) RESIDUE SPREAD MONITORING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK)

(73) Assignee: AGCO International GmbH, Neuhausen (CH)

( * ) Notice: Subject to any disclaimer, the term of this patent is extended or adjusted under 35 U.S.C. 154(b) by 437 days.

(21) Appl. No.: 17/664,219

(22) Filed: May 19, 2022

(65) Prior Publication Data

US 2022/0369554 A1   Nov. 24, 2022

(30) Foreign Application Priority Data

May 19, 2021   (GB) ...................................... 2107135

(51) Int. Cl.
*A01D 41/127* (2006.01)
*A01B 79/00* (2006.01)
*G06T 7/00* (2017.01)

(52) U.S. Cl.
CPC .......... *A01D 41/127* (2013.01); *A01B 79/005* (2013.01); *G06T 7/0004* (2013.01)

(58) Field of Classification Search
CPC ....... A01B 79/005; A01F 12/40; G01S 13/88; G01S 17/88; G06T 7/0004; G06T 2207/30188
See application file for complete search history.

(56) References Cited

U.S. PATENT DOCUMENTS

| | | | |
|---|---|---|---|
| 5,569,081 A | 10/1996 | Baumgarten et al. | |
| 9,668,418 B2 | 6/2017 | Patton et al. | |
| 10,470,365 B2 | 11/2019 | Mahieu et al. | |
| 2011/0093169 A1* | 4/2011 | Schroeder .......... | A01D 41/1243 701/50 |
| 2014/0263713 A1 | 9/2014 | Volker et al. | |
| 2017/0055445 A1* | 3/2017 | Mahieu .................. | A01F 12/40 |
| 2017/0086373 A1 | 3/2017 | Mahieu et al. | |
| 2018/0249641 A1* | 9/2018 | Lewis ..................... | B02C 23/28 |
| 2018/0310474 A1* | 11/2018 | Posselius ............. | A01D 41/127 |
| 2019/0269071 A1* | 9/2019 | Dilts .................. | A01D 41/1243 |

(Continued)

FOREIGN PATENT DOCUMENTS

| | | |
|---|---|---|
| EP | 1269818 A1 | 1/2003 |
| EP | 1790207 A1 | 5/2007 |

(Continued)

OTHER PUBLICATIONS

UK Intellectual Property Office, Search report for UK Priority Application No. GB2107135.2, dated Feb. 17, 2022.

*Primary Examiner* — Fadey S. Jabr
*Assistant Examiner* — Mario C Gonzalez

(57) ABSTRACT

Systems and methods for monitoring the distribution of residue material from a spreader tool of an agricultural machine including a sensor, preferably a LIDAR or other scanning transceiver-type sensor mounted or otherwise coupled to the machine and orientated with a sensing region pointing rearwards of the agricultural machine, where operational data indicative of an operational parameter of the spreader tool is obtained and used to control operation of the sensor.

13 Claims, 3 Drawing Sheets

(56) References Cited

U.S. PATENT DOCUMENTS

| | | |
|---|---|---|
| 2020/0120869 A1 | 4/2020 | Vandike et al. |
| 2021/0015039 A1 | 1/2021 | Vandike et al. |
| 2021/0034867 A1 | 2/2021 | Ferrari et al. |
| 2022/0099808 A1* | 3/2022 | Kamil .................... G01S 7/497 |

FOREIGN PATENT DOCUMENTS

| | | |
|---|---|---|
| EP | 2936962 A1 | 10/2015 |
| EP | 3298880 A1 | 3/2018 |
| EP | 3494773 A1 | 6/2019 |
| EP | 3613272 A1 | 2/2020 |
| WO | 2018162699 A1 | 9/2018 |

* cited by examiner

RESIDUE SPREAD MONITORING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted build-up of residue in a given area, again leading to uniformity issues.

To control the distribution of the MOG, known combines include spreader tools which can include deflectors/steering vanes, fans or the like which are controllable by an operator of the combine. Generally, this is a manual process and the operator must observe the distribution of the MOG during operation and make any necessary adjustments to the spreader tool manually. The distribution of the MOG can be affected by numerous operating conditions, including wind speed, water content of the material, gradient of the field, etc. Accordingly, observing and adjusting the spreader tool manually can be relatively complex and time consuming, especially where the operating conditions vary across the area to be harvested.

In an attempt to address this problem it is known to utilise sensors, e.g. wind direction sensors, ultrasonic sensors, cameras and the like operable to infer or monitor the distribution of the MOG in real time. In some instances, information relating to the observed distribution may be relayed to the operator of the combine (e.g. through a user interface within the operator cab) who may use this information to adjust operation of the spreader tool. In further solutions, control of the spreader tool has been at least partly automated based on data from such sensors, for example by controlling the direction of one or more steering vanes/ deflectors in an attempt to account for wind direction. However, such systems are relatively complex and no complete solution has been realised.

It would be advantageous to improve upon these known systems such that the distribution of material from an agricultural machine can be monitored and optionally controlled more effectively and efficiently.

SUMMARY OF THE INVENTION

In an aspect of the invention there is provided a system for monitoring the distribution of residue material from a spreader tool of an agricultural machine, the system comprising: a sensor having a sensing region rearwards of the agricultural machine; and one or more controllers, configured to: receive operational data indicative of an operational parameter of the spreader tool; and control operation of the sensor in dependence thereon.

Advantageously, the system of the present invention is able to control operation of the sensor based on the spreader tool operation such that any fluctuation or variation in spreader tool operation can be accounted for in the sensor data.

The sensor is preferably a "transceiver type" sensor, which is to be understood herein as a sensor including a transmitting component for transmitting a measurement signal and a receiving component for receiving reflected measurement signals. The sensor may comprise a RADAR sensor, LIDAR sensor, infrared sensor, or the like, for example. In presently preferred embodiments the sensor comprises a three-dimensional LIDAR sensor, having a three-dimensional sensing region.

The system may be configured such that the one or more controllers are operable to control a scan speed or scan frequency of the LIDAR sensor in dependence on the operational parameter of the spreader tool. The system may be configured such that a scanning direction of the LIDAR sensor may be controlled in dependence on the operational parameter of the spreader tool. The LIDAR sensor may preferably comprise a rotating sensor, which may comprise a motor for controlling the rate at which the sensor (or components thereof) rotate in operation, and/or a sensor encoder for monitoring an orientation or rotational rate of one or more components of the sensor, in use. The system may be configured such that a rotational scanning direction of the LIDAR sensor may be controlled in dependence on the operational parameter of the spreader tool. The sensor may include a plurality of transmitting components and/or a plurality of receiving components.

The spreader tool may comprise a steering mechanism which may include, for example, one or more steering vanes or deflectors. The operational parameter of the spreader tool may comprise a position, e.g. a rotational position, of the one or more steering vanes or deflectors.

In embodiments, the steering mechanism of the spreader tool may include a first steering unit for controlling the distribution of residue material from the spreader tool in a first direction. The steering mechanism may include a second steering unit for controlling distribution of residue material from the spreader tool in a second direction. The first and second directions may correspond to a left hand side and a right hand side of the agricultural machine. The operational parameter of the spreader tool may comprise an operational speed of the first and/or second steering units.

The steering mechanism of the spreader tool may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor— e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The operational parameter of the spreader tool may comprise an operational speed (optionally a rotational speed) of the first and/or second rotors. The operational parameter of the spreader tool may comprise a rotational frequency of the first and/or second rotors. The operational parameter of the spreader tool may comprise a position, e.g. an angular position or orientation, of the first and/or second rotors. The operational parameter of the spreader tool may comprise a rotational direction of the first and/or second rotors.

The system may comprise a spreader encoder for monitoring the rotational position, speed and/or frequency of the first and/or second rotors. The spreader encoder may comprise a magnetic encoder, or may be a photo-electric encoder, or may comprise the use of one or more imaging means (e.g. a camera) to identify the position and/or movement of one or more visual indicators provided on the first and/or second rotors.

The system may be configured such that the one or more controllers are operable to control operation of the sensor in dependence on a rotational speed, rotational frequency and/or angular position of the first and/or second rotors. In presently preferred embodiments, the one or more controllers are operable to control a scan speed of the sensor such that the scanning frequency of the sensor is substantially synchronised with the rotational frequency of the first and/or second rotors. For example, each individual scan of the sensor may correspond to one full rotation of the first and/or second rotor. Alternatively, each individual scan of the sensor may correspond to multiple full rotations of the first and/or second rotor. Alternatively, each full rotation of the first and/or second rotor may correspond to multiple complete scans of the sensor. In each of these embodiments, the present invention advantageously synchronises the scan rate of the sensor with the operational frequency of the spreader tool such that the data obtained from the sensor is obtained with maximum consistency between scans. That is, the sensor data has been obtained under the same, or at least substantially the same, operating conditions and ultimately providing a more accurate representation of variations in a residue distribution observed using the sensor.

The one or more controllers may be operable to receive data from the sensor indicative of a measure of residue material within the sensing region. The one or more controllers may be operable to determine, from the sensor data, a distribution of residue material associated with the spreader tool. The one or more controllers may be operable to output one or more control signals for controlling one or more operational parameters of the agricultural machine or one or more components thereof in dependence on the determined distribution.

In embodiments, the one or more systems of the agricultural machine controllable by the system of the present aspect may include a user interface, e.g. a display means, which may provide information, for example to an operator of the agricultural machine corresponding to the observed residue material distribution. This may comprise visually illustrating the observed distribution, or providing an audible or visual indicator to the operator of the observed residue distribution. For example, the user interface may be operable to or be instructed by the one or more controllers (e.g. through control signals output by the one or more controllers) to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the system may be configured to output an indicator if the observed distribution differs from the desired distribution, or differs from the desired distribution by a predetermined amount.

In further embodiments, the system may be operable to control one or more operating parameters of the spreader tool in dependence on the observed residue material distribution. This may include controlling one or more operating parameters of a steering mechanism of the spreader tool, such as the first and/or second rotors (where present). The system may be operable to control the speed and/or frequency of operation of the first and/or second rotors, e.g. by setting a desired operational speed/frequency (noting that there may be slight fluctuations/variations therein as discussed above). The system may be configured to control the position, e.g. an angular position of one or more steering vanes or deflectors of the spreader tool.

It will be appreciated that the speed at which the first and second rotors operate may be used to control the extent to which the residue material is distributed from the spreader tool. Accordingly, the system may be operable to control a speed of the first and/or second rotors (e.g. a rotational speed of a rotatable element of the rotor(s). For example, the system may be operable to increase the speed of the first rotor to increase a distance at which the residue material is distributed in the first direction. Likewise, the system may be operable to increase the speed of the second rotor to increase a distance at which the residue material is distributed in the second direction. The system may be operable to decrease the speed of the first and/or second rotor to decrease a distance at which the residue material is distributed in the first/second direction.

The system may be operable to control the first steering unit and the second steering unit independently, such that the distribution of residue material from the spreader tool in the first direction and the second direction may be controlled generally independently from one another.

In a further aspect of the invention there is provided a control system or monitoring the distribution of residue material from a spreader tool of an agricultural machine using a sensor mounted or otherwise coupled to the agricultural machine, the control system comprising one or more controllers, and being configured to: receive operational data indicative of an operational parameter of the spreader tool; and generate and output one or more control signals for controlling operation of the sensor in dependence on the operational parameter of the spreader tool.

The one or more controllers may collectively comprise an input (e.g. an electronic input) for receiving one or more input signals indicative of the operational parameter of the spreader tool. The one or more controllers may collectively comprise one or more processors (e.g. electronic processors) operable to execute computer readable instructions for controlling operation of the control system, for example to determine the operational parameter from the received input signal(s). The one or more processors may be operable to generate one or more control signals for controlling operation of the sensor. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

In an aspect of the invention there is provide an agricultural machine comprising the system or control system of any preceding aspect.

Optionally, the agricultural machine may comprise a harvesting vehicle, such as a combine harvester, for example.

In a further aspect of the invention there is provided a method of monitoring the distribution of residue material from a spreader tool of an agricultural machine using a sensor mounted or otherwise coupled to the agricultural machine, the method comprising: receiving operational data indicative of an operational parameter of the spreader tool; and controlling operation of the sensor in dependence thereon.

The sensor may preferably comprise a LIDAR sensor.

The method may comprise controlling a scan speed or scan frequency of the LIDAR sensor in dependence on the operational parameter of the spreader tool. The method may comprise controlling a scanning direction of the LIDAR sensor in dependence on the operational parameter of the spreader tool. The LIDAR sensor may preferably comprise a rotating sensor, which may comprise a motor for controlling the rate at which the sensor (or components thereof) rotate in operation, and/or a sensor encoder for monitoring an orientation or rotational rate of one or more components of the sensor, in use. The sensor may include a plurality of transmitting components and/or a plurality of receiving components.

The spreader tool may comprise a steering mechanism which may include, for example, one or more steering vanes or deflectors. The operational parameter of the spreader tool may comprise a position, e.g. a rotational position, of the one or more steering vanes or deflectors.

In embodiments, the steering mechanism of the spreader tool may include a first steering unit for controlling the distribution of residue material from the spreader tool in a first direction. The steering mechanism may include a second steering unit for controlling distribution of residue material from the spreader tool in a second direction. The first and second directions may correspond to a left hand side and a right hand side of the agricultural machine. The operational parameter of the spreader tool may comprise an operational speed of the first and/or second steering units.

The steering mechanism of the spreader tool may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The operational parameter of the spreader tool may comprise an operational speed (optionally a rotational speed) of the first and/or second rotors. The operational parameter of the spreader tool may comprise a rotational frequency of the first and/or second rotors. The operational parameter of the spreader tool may comprise a position, e.g. an angular position or orientation, of the first and/or second rotors. The operational parameter of the spreader tool may comprise a rotational direction of the first and/or second rotors.

A spreader encoder may be used for monitoring the rotational position, speed and/or frequency of the first and/or second rotors. The spreader encoder may comprise a magnetic encoder, or may be a photo-electric encoder, or may comprise the use of one or more imaging means (e.g. a camera) to identify the position and/or movement of one or more visual indicators provided on the first and/or second rotors.

The method may comprise controlling operation of the sensor in dependence on a rotational speed, rotational frequency and/or angular position of the first and/or second rotors. In presently preferred embodiments, the method may comprise controlling a scan speed of the sensor such that the scanning frequency of the sensor is substantially synchronised with the rotational frequency of the first and/or second rotors. For example, each individual scan of the sensor may correspond to one full rotation of the first and/or second rotor. Alternatively, each individual scan of the sensor may correspond to multiple full rotations of the first and/or second rotor. Alternatively, each full rotation of the first and/or second rotor may correspond to multiple complete scans of the sensor.

The method may comprise receiving data from the sensor indicative of a measure of residue material within the sensing region. The method may comprise determining, from the sensor data, a distribution of residue material associated with the spreader tool. The method may comprise controlling one or more operational parameters of the agricultural machine or one or more components thereof in dependence on the determined distribution.

In embodiments, the method may comprise controlling a user interface, e.g. a display means, which may provide information, for example to an operator of the agricultural machine corresponding to the observed residue material distribution. This may comprise visually illustrating the observed distribution, or providing an audible or visual indicator to the operator of the observed residue distribution. For example, the user interface may be used to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the method may include outputting an indicator if the observed distribution differs from the desired distribution, or differs from the desired distribution by a predetermined amount.

In further embodiments, the method may comprise controlling one or more operating parameters of the spreader tool in dependence on the observed residue material distribution. This may include controlling one or more operating parameters of a steering mechanism of the spreader tool, such as the first and/or second rotors (where present). The speed and/or frequency of operation of the first and/or second rotors may be controlled, e.g. by setting a desired operational speed/frequency (noting that there may be slight fluctuations/variations therein as discussed above). The position, e.g. an angular position of one or more steering vanes or deflectors of the spreader tool may be controlled.

It will be appreciated that the speed at which the first and second rotors operate may be used to control the extent to which the residue material is distributed from the spreader tool. Accordingly, the method may comprise controlling a speed of the first and/or second rotors (e.g. a rotational speed of a rotatable element of the rotor(s). For example, increasing the speed of the first rotor may increase a distance at which the residue material is distributed in the first direction. Likewise, increasing the speed of the second rotor may increase a distance at which the residue material is distributed in the second direction. The method may comprise decreasing the speed of the first and/or second rotor to decrease a distance at which the residue material is distributed in the first/second direction.

The first steering unit and the second steering unit may be controlled independently, such that the distribution of residue material from the spreader tool in the first direction and the second direction may be controlled generally independently from one another.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
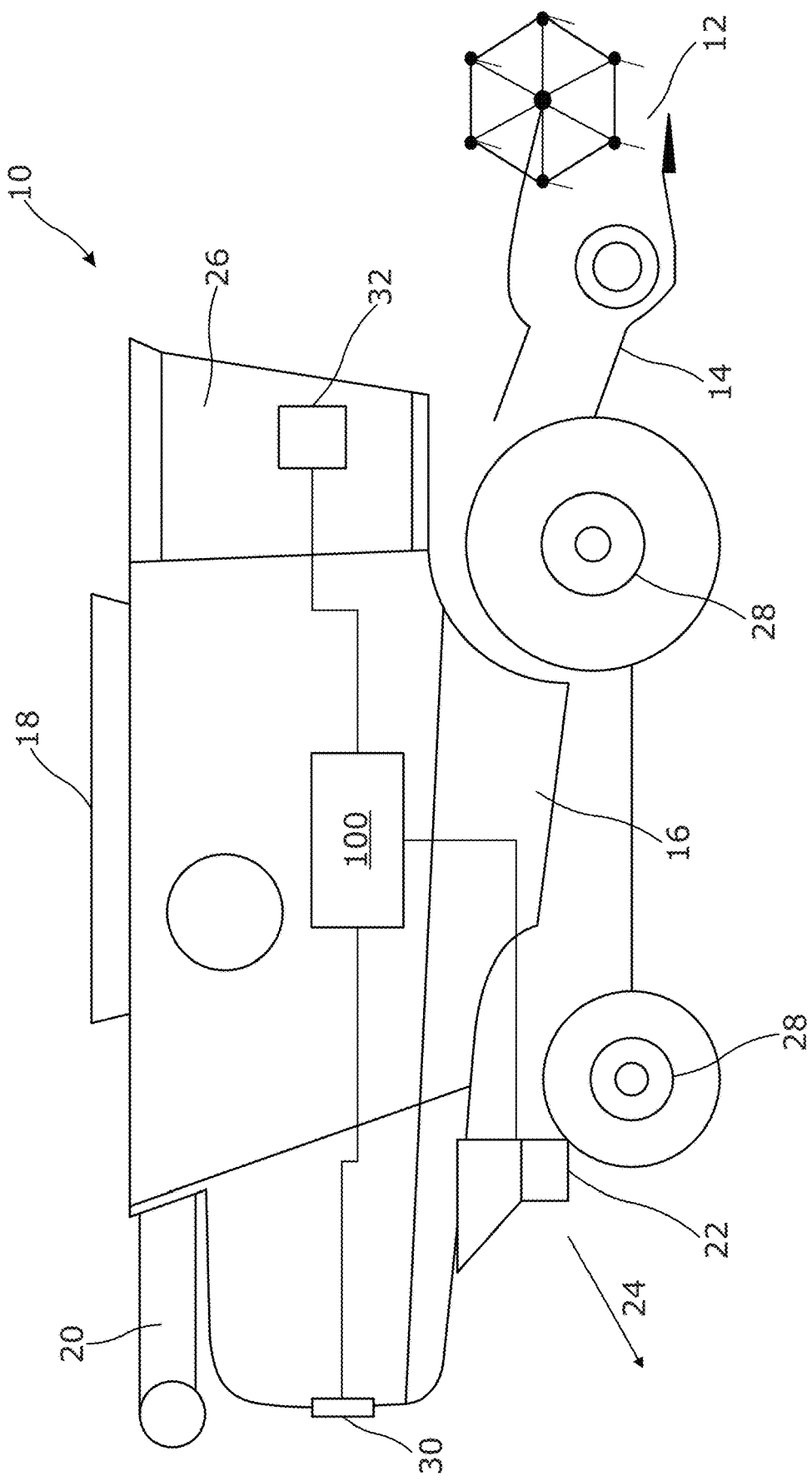
FIG. 1 is a schematic side cross-sectional view of an agricultural harvester embodying aspects of the invention.

FIG. 1 illustrates an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG) or residue material (used interchangeably herein)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue material is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the residue material before it is spread by the spreader tool 22.

The combine 10 also typically includes, amongst other features, an operator cab 26, wheels 28, engine (not shown) and a user interface 32.

As will be discussed in detail herein, the combine 10 additionally includes a sensor in the form of a LIDAR unit 30. As will be appreciated, the LIDAR unit 30 is transceiver type sensing unit, having a transmitter component for transmitting measurement signals, and a receiver component for receiving reflected measurement signals from objects within the environment of the combine 10. Specifically, LIDAR unit 30 is a three-dimensional LIDAR sensor having a three-dimensional measurement region. The LIDAR unit 30 is a rotating sensor, and includes a motor (not shown) for controlling the rate at which the sensor (or components thereof) rotate in operation, and a sensor encoder (not shown) for monitoring an orientation or rotational rate of one or more components of the sensor unit 30, in use. The LIDAR unit 30 is used, and the sensor data therefrom for example, may be used to determine a distribution of residue material associated with the spreader tool 22.

Figure 2:
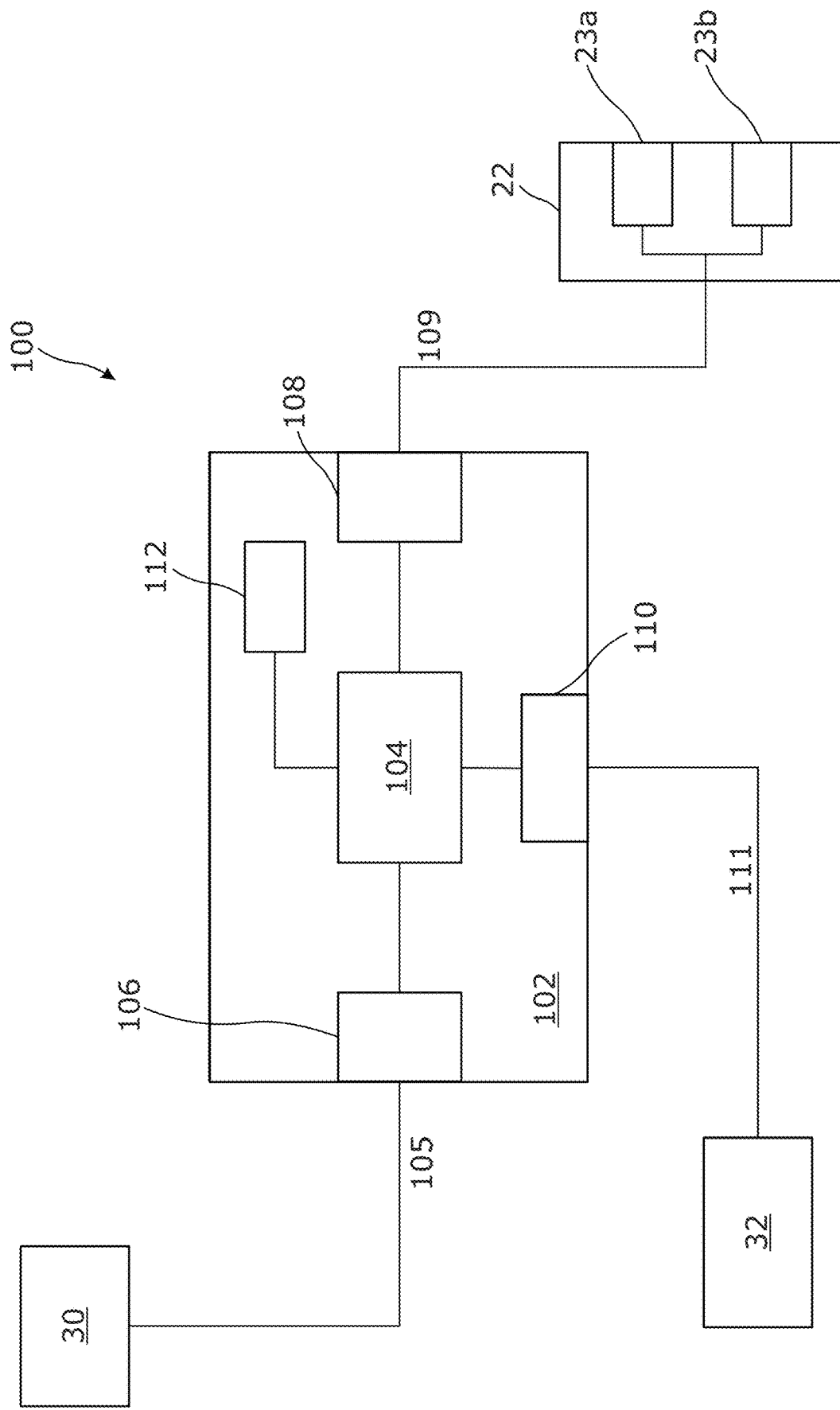
FIG. 2 is a schematic view of an embodiment of a control system of the invention.

FIG. 2 illustrates control system 100 further. As shown, control system 100 comprises a controller 102 having an electronic processor 104, an electronic transceivers 106, 108, 110. The processor 104 is operable to access a memory 112 of the controller 102 and execute instructions stored therein to perform the steps and functionality of the present invention, for example to output control signals 105 via the transceiver 106 for controlling a scanning operation of the LIDAR unit 30, or outputting control signals 111 via transceiver 110 for controlling the user interface 32, for example to provide an image to an operator of the combine 10 illustrative of the observed residue material distribution as determined from sensor data received from LIDAR unit 30.

The processor 104 is operable to receive operational data from the spreader tool 22, which in the illustrated embodiment takes the form of input signals 109 received at transceiver 108. Here, and as discussed in detail below, the operational data received is indicative of an operational frequency of first and second rotors 23a, 23b of the spreader tool.

Output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 may be operable to control the user interface 32 to display to the operator a graphical representation of the residue material distribution from the spreader tool 22 as determined by processor 104, image data obtained from a camera on the combine 10, or other useful information. The user interface 32 may also be operable to receive a user input from the operator, and in such instances the output 110 may act as an input for receiving that user input at the processor 104. The user input may relate to a requested or desired distribution of residue material, for example, made by the operator of the combine 10.

The processor 104 may additionally be operable to receive sensor data via transceiver 106, received from the LIDAR unit 30. From this, the processor 104 is operable to determine a residue material distribution in the manner described hereinbelow.

Figurers 4 and 5 illustrate operational use of aspects of the invention.

As discussed herein, aspects of the invention relate to the use of operational data from the spreader tool 22 to control operation of the LIDAR unit 30. Specifically, the control system 100 is configured to control the scanning speed and/or frequency of the LIDAR unit 30 in dependence on operational data from the spreader tool 22.

Figure 4:
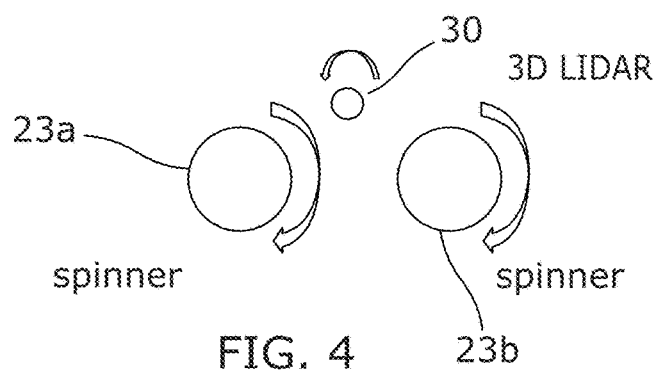
FIG. 4 is a schematic view of an arrangement illustrating aspects of the invention.
Figure 5:
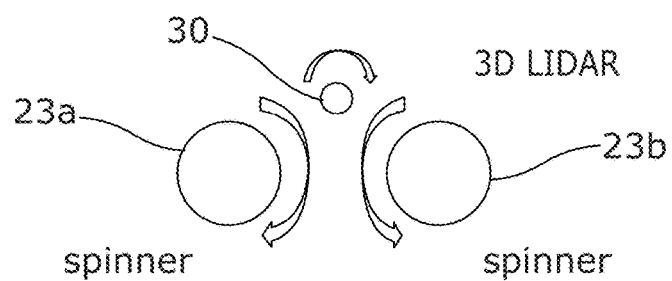
FIG. 5 is a further schematic view of an arrangement illustrating further aspects of the invention.

The spreader tool 22 includes a steering mechanism which includes a first steering unit in the form of a first rotor 23a for controlling the distribution of residue material from the spreader tool 22 in a first direction (left in the orientation shown in FIGS. 4 and 5), and a second steering unit in the form of a second rotor 23b for controlling distribution of residue material from the spreader tool in a second direction (right in the orientation shown in FIGS. 4 and 5). The first and second directions generally correspond to a left hand side and a right hand side of the agricultural machine. The rotors 23a, 23b are operable to provide a motive force for the residue material through the spreader tool 22, by providing or inducing an airflow through the spreader tool 22, and/or providing a motive force through contacting the residue material with one or more moveable elements of the rotor(s) 23a, 23b. In the illustrated embodiment, the control system 100 is configured to receive operational data from the spreader tool 22 indicative of a rotational frequency of the first and/or second rotors 23a, 23b.

Processor 10 is operable to control operation of the LIDAR unit 30 in dependence on the rotational frequency of the first and/or second rotors 23a, 23b, and specifically to control a scan speed of the LIDAR unit 30 such that the scanning frequency of the LIDAR unit 30 is substantially synchronised with the rotational frequency of the first and/or second rotors 23a, 23b.

FIGS. 4 and 5 illustrate two different operational use cases for the control system 100, specifically illustrating that the first and second rotors 23a, 23b may each rotate in either direction as required by the circumstances. Accordingly, the system is configured such that operation of the LIDAR unit 30 may be controlled in dependence on a direction of rotation of the first and/or second rotors 23a, 23b, which includes controlling a scanning direction of the LIDAR unit 30, as well as a scanning frequency and/or speed.

Figure 3:
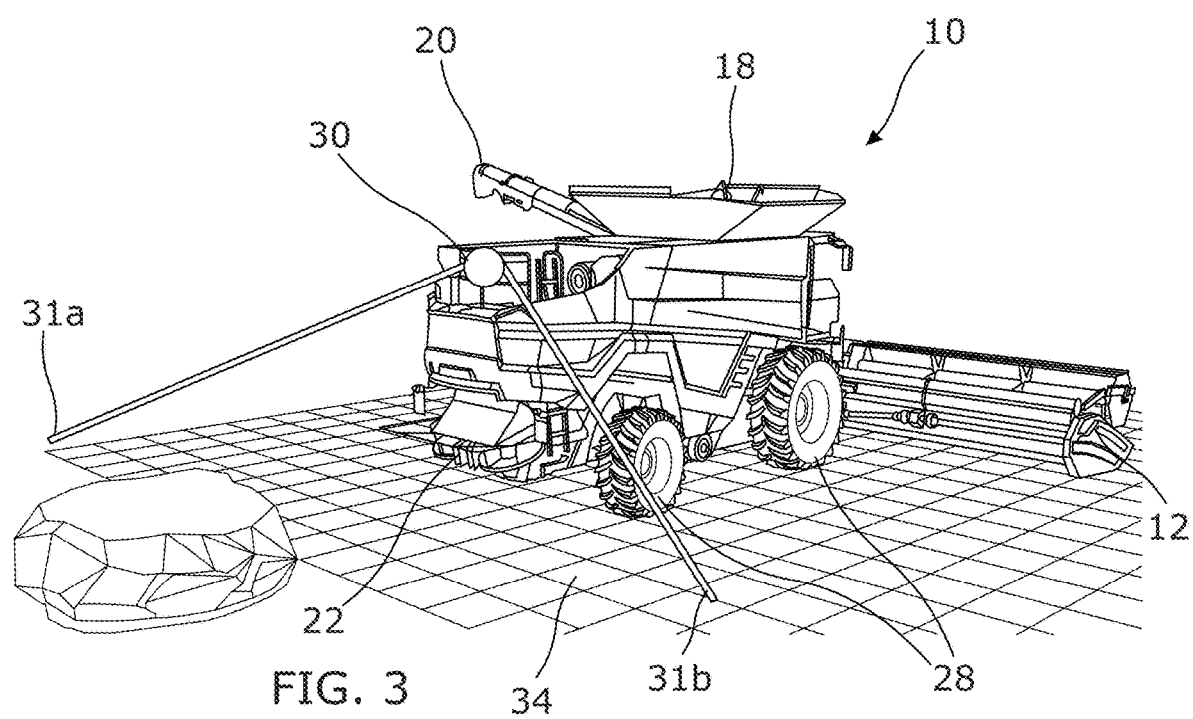
FIG. 3 is a perspective view illustrating embodiments of a harvester incorporating aspects of the invention.

FIG. 3 illustrates further combine 10, and includes header 12, unloading auger 20, wheels 28 and grain bin 18, and employs a system comprising control system 100 discussed herein, and the associated sensor in the form of LIDAR unit 30. FIG. 3 specifically shows the position of the LIDAR unit 30, with it mounted to the combine 10 above the spreader tool 22, and orientated such that its sensing region 34 is angled downwards towards the ground surface onto which the residue material is ultimately spread by the spreader tool 22. The sensing region 34 is delineated by sensing boundaries 31a, 31b.

In an extension of the present invention, the processor 104 is operable to receive data from the LIDAR unit 30 indicative of a measure of residue material within the measurement region 34, and be operable to determine, from the sensor data, a distribution of residue material associated with the spreader tool 22. The processor may then be configured to output one or more control signals for controlling one or more operational parameters of the agricultural machine or one or more components thereof in dependence on the determined distribution. For example, the processor 104 may be operable to output control signals 111 via transceiver 110 to the user interface 32 for to graphically illustrate the determined distribution, or to provide an audible or visual indicator to the operator of the observed residue distribution. Additionally or alternatively, the processor 104 may be operable to control one or more operating parameters of the spreader tool 22 in dependence on the observed residue material distribution. This may include controlling one or more operating parameters of a steering mechanism of the spreader tool 22, such as the first and/or second rotors 23a, 23b.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for monitoring distribution of residue material from a spreader tool of an agricultural machine, the system comprising:
   a LIDAR sensor having a sensing region rearwards of the agricultural machine; and
   at least one controller, configured to:
      receive, from the spreader tool, operational data indicative of an operational parameter of the spreader tool, wherein the operational parameter comprises:
         a rotational frequency of a first rotor of a first steering unit of the spreader tool; and
         a rotational frequency of a second rotor of a second steering unit of the spreader tool; and
      based on the received operation data, control a scan speed or a scan frequency of the LIDAR sensor such that the scanning frequency of the LIDAR sensor is synchronized with at least one of the rotational frequency of the first rotor of the first steering unit or the rotational frequency of the second rotor of the second steering unit.

2. The system of claim 1, wherein each of the first steering unit and the second steering unit respectively comprises a steering mechanism which includes at least one steering vane or deflector; and wherein the operational parameter of the spreader tool further comprises a position of the at least one steering vane or deflector.

3. The system of claim 1, wherein the first steering unit comprising the first rotor is configured to control the distribution of residue material from the spreader tool in a first direction; and the second steering unit comprising the second rotor is configured to control distribution of residue material from the spreader tool in a second direction; and wherein the operational parameter of the spreader tool further comprises an operational speed of the first and/or second steering units.

4. The system of claim 1, wherein the
first steering unit is configured to control movement of residue material through and out of the spreader tool in a first direction, and
wherein the operational parameter of the spreader tool further comprises:
an operational speed of the first rotor;
a position of the first rotor; and
a rotational direction of the first rotor.

5. The system of claim 4, wherein the at least one controller is operable to control operation of the LIDAR sensor based on at least one of the rotational speed, the rotational frequency, or the angular position of the first rotor.

6. The system of claim 4, wherein
the second steering unit is configured to control movement of residue material through and out of the spreader tool in a second direction, and
wherein the operational parameter of the spreader tool further comprises:
an operational speed of the second rotor;
a position of the second rotor; and/or
a rotational direction of the second rotor.

7. The system of claim 6, wherein the at least one controller is operable to control operation of the LIDAR sensor based on at least one of the rotational speed, the rotational frequency, or the angular position of the second rotor.

8. The system as claimed in claim 1, wherein the at least one controller is operable to:
receive data from the sensor indicative of a measure of the residue material within the sensing region;
determine, from the sensor data, a distribution of the residue material associated with the spreader tool; and
output at least one control signal for controlling at least one operational parameter of the agricultural machine or at least one component of the agricultural machine based on the determined distribution.

9. The system of claim 8, wherein at least one system of the agricultural machine includes a user interface which provides information corresponding to the distribution of residue material.

10. The system of claim 8, operable to control at least one operating parameter of the spreader tool based upon the distribution of residue material.

11. An agricultural machine comprising the system of claim 1.

12. A method of monitoring the distribution of residue material from a spreader tool of an agricultural machine using a LIDAR sensor mounted or otherwise coupled to the agricultural machine, the method comprising:
receiving, from the spreader tool, operational data indicative of an operational parameter of the spreader tool, wherein the operational parameter comprises:
a rotational frequency of a first rotor of a first steering unit of the spreader tool; and
a rotational frequency of a second rotor of a second steering unit of the spreader tool; and based on the received operation data, controlling a scan speed or scan frequency of the LIDAR sensor such that the scanning frequency of the LIDAR sensor is synchronized with at least one of the rotational frequency of the first rotor of the first steering unit or the rotational frequency of the second rotor of the second steering unit.

13. A system for monitoring distribution of residue material from a spreader tool of an agricultural machine, the system comprising:
a sensor having a sensing region rearwards of the agricultural machine; and
at least one controller, configured to:
receive, from the spreader tool, operational data indicative of an operational parameter of the spreader tool, wherein the operational parameter comprises:
a rotational frequency of a first rotor of a first steering unit of the spreader tool; and
a rotational frequency of a second rotor of a second steering unit of the spreader tool; and
based on the received operation data, control a scan speed or a scan frequency of the sensor based upon the operational data such that the scanning frequency of the sensor is synchronized with at least one of the rotational frequency of the first rotor of the first steering unit or the rotational frequency of the second rotor of the second steering unit.

\* \* \* \* \*